(12) United States Patent
Oono et al.

(10) Patent No.: US 9,022,767 B2
(45) Date of Patent: May 5, 2015

(54) MOLD THICKNESS ADJUSTING APPARATUS OF INJECTION MOLDING MACHINE

(71) Applicant: Fanuc Corporation, Minamitsuru-gun, Yamanashi (JP)

(72) Inventors: Hajime Oono, Yamanashi (JP); Mitsushi Yoshioka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/075,179

(22) Filed: Nov. 8, 2013

(65) Prior Publication Data

US 2014/0134284 A1 May 15, 2014

(30) Foreign Application Priority Data

Nov. 9, 2012 (JP) ................................. 2012-247479

(51) Int. Cl.
*B29C 45/76* (2006.01)
*B29C 45/17* (2006.01)

(52) U.S. Cl.
CPC .................................. *B29C 45/1751* (2013.01)

(58) Field of Classification Search
CPC  B29C 45/0408; B29C 45/64; B29C 45/7653; B29C 45/78; B29C 45/80
USPC .......... 425/141, 143, 150, 170, 171, 589, 590
See application file for complete search history.

(56) References Cited

U.S. PATENT DOCUMENTS

| | | | | |
|---|---|---|---|---|
| 4,966,738 A | * | 10/1990 | Inaba et al. ................... | 264/40.5 |
| 5,059,365 A | * | 10/1991 | Hertzer et al. ................ | 264/40.5 |
| 5,344,301 A | * | 9/1994 | Kamiguchi et al. .......... | 425/169 |
| 7,510,619 B2 | * | 3/2009 | LaPlante et al. .............. | 156/261 |
| 2004/0067276 A1 | * | 4/2004 | Watanabe ...................... | 425/595 |
| 2005/0214407 A1 | * | 9/2005 | Watanabe et al. ............. | 425/595 |
| 2005/0218544 A1 | | 10/2005 | Hakoda et al. | |
| 2005/0244537 A1 | * | 11/2005 | Uchiyama et al. ............ | 425/593 |
| 2008/0211126 A1 | * | 9/2008 | Kobayashi et al. .......... | 264/40.5 |
| 2012/0146260 A1 | | 6/2012 | Murata et al. | |

FOREIGN PATENT DOCUMENTS

JP    4-103311 A    4/1992
JP    6315755 A    11/1994

(Continued)

OTHER PUBLICATIONS

Machine Translation of JPH06315755, Takahashi Toshimitsu, Aug. 22, 2014, 11 pages.*

(Continued)

*Primary Examiner* — Yogendra Gupta
*Assistant Examiner* — Emmanuel S Luk
(74) *Attorney, Agent, or Firm* — Lowe Hauptman & Ham, LLP

(57) ABSTRACT

An injection molding machine is provided with an automatic mold thickness adjusting apparatus. The amount of compensation of the position of a rear platen that is adjusted at the time of installation of a mold is determined by calculating the thermal expansion of the mold that is expected to occur at the completion of a rise in temperature based on the difference in temperature between the mold temperature at the time of mold thickness adjustment and the mold temperature at the time of injection molding. Then, the rear platen is moved to the compensated position thus determined.

2 Claims, 3 Drawing Sheets

(56) References Cited

FOREIGN PATENT DOCUMENTS

| | | | | |
|---|---|---|---|---|
| JP | 1405709 | * | 4/2004 | ............. B29C 45/76 |
| JP | 2004122579 A | | 4/2004 | |
| JP | 2005280047 A | | 10/2005 | |
| JP | 2005288893 A | | 10/2005 | |
| JP | 2009208412 A | | 9/2009 | |
| JP | 2010110960 A | | 5/2010 | |
| JP | 2010274661 A | | 12/2010 | |
| WO | 2011161899 A1 | | 12/2011 | |

OTHER PUBLICATIONS

Office Action mailed Apr. 15, 2014, corresponds to Japanese patent application No. 2012-247479.

* cited by examiner

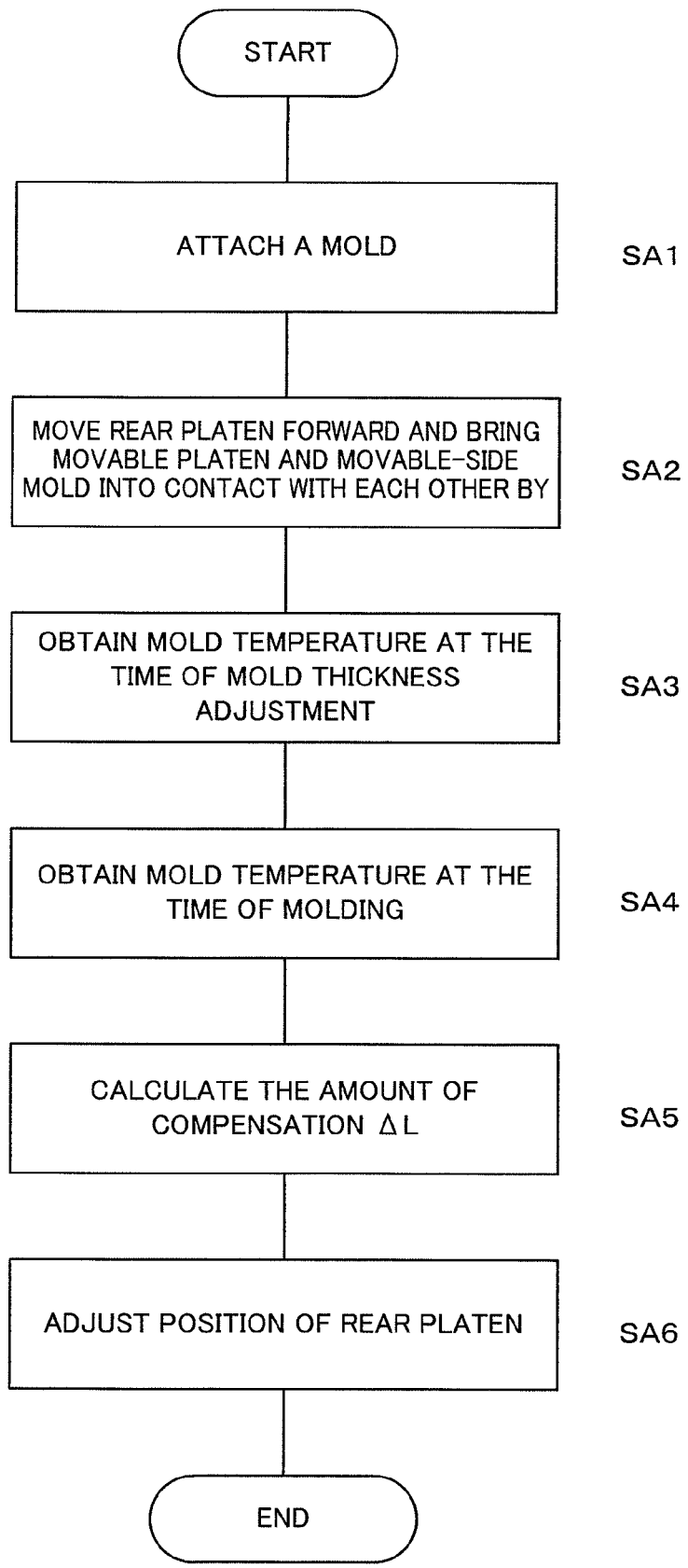

MOLD THICKNESS ADJUSTING APPARATUS OF INJECTION MOLDING MACHINE

RELATED APPLICATIONS

The present application is based on and claims priority to Japanese Application Number 2012-247479, filed Nov. 9, 2012, the disclosure of which is hereby incorporated by reference herein in its entirety.

BACKGROUND OF THE INVENTION

1. Field of the Invention

The present invention relates to an automatic mold thickness adjusting apparatus of an injection molding machine that can automatically adjust a mold thickness in the injection molding machine.

2. Description of the Related Art

To obtain a good product by an injection molding machine, it is important to maintain a clamping force at a predetermined value. A mold attached to the injection molding machine is operated in a state in which the mold is heated and the temperature thereof is raised, and the rise in temperature makes the mold thermally expand. Therefore, consideration has to be given to the thermal expansion of the mold when adjusting the clamping force.

Japanese Patent Application Laid-Open No. 4-103311 discloses a technique of detecting and storing a mold temperature at the time of mold thickness adjustment that is performed at a low ambient temperature when adjusting a clamping force, detecting the temperature of the mold at every molding cycle after the start of the molding cycle, comparing the temperature with the mold temperature at the time of previous mold thickness adjustment, and, when the difference is greater than or equal to a set value, continuing the molding cycle after performing a mold thickness adjustment again.

The problem of the technique disclosed in Japanese Patent Application Laid-Open No. 4-103311 described above is that, at a molding cycle, when the difference between the detected mold temperature and the mold temperature at the time of mold thickness adjustment is greater than or equal to a set value, despite the mold thickness adjustment performed at a low ambient temperature, the mold thickness adjustment is performed again, which requires much time to perform an adjustment, resulting in a prolonged equipment shutdown time and low productivity.

Moreover, another problem is that, since the mold thickness adjustment is performed after the molding cycle is performed, the position of a rear platen is adjusted after clamping is performed once in a state in which the mold has thermally expanded due to a rise in temperature, and therefore, in a state before the position of the rear platen is adjusted, an excessive clamping force is applied to the mold and an excessive load is put on the injection molding machine, which significantly reduces the longevity of the machine.

SUMMARY OF THE INVENTION

An object of the present invention is accordingly to provide an automatic mold thickness adjusting apparatus of an injection molding machine that reduces the time required to perform a mold thickness adjustment by calculating the amount of thermal expansion of a mold from input molding conditions and compensating the position of a rear platen that is adjusted at the time of installation of the mold and thereby prevents the longevity of the machine from being reduced as a result of an excessive load being put on the injection molding machine.

In a mold thickness adjusting apparatus of an injection molding machine according to the present invention, the injection molding machine includes a fixed platen to which a fixed-side mold is attached, a rear platen coupled to the fixed platen via a plurality of tie bars, a clamping mechanism provided in the rear platen, and a movable platen which is arranged so as to move forward and backward along the tie bars by means of the clamping mechanism and to which a movable-side mold is attached. On the other hand, the mold thickness adjusting apparatus performs a mold thickness adjustment by adjusting a space between the fixed platen and the rear platen and include a mold temperature setting unit that sets a temperature of any one of the fixed-side mold and the movable-side mold or both at a time of molding, a mold temperature obtaining unit that obtains a temperature of any one of the fixed-side mold and the movable-side mold or both at a time of mold thickness adjustment, a temperature difference calculating unit that calculates a difference in temperature between the temperature set by the mold temperature setting means and the temperature obtained by the mold temperature obtaining means, a mold thermal expansion amount calculating unit that calculates amounts of thermal expansion of the fixed-side mold and the movable-side mold from the difference in temperature, a rear platen position determination unit that determines a position of the rear platen which can generate a set clamping force at an ambient temperature at the time of mold thickness adjustment, a rear platen position compensation unit that determines a compensated rear platen position by adding the amounts of thermal expansion of the fixed-side mold and the movable-side mold to the position of the rear platen thus determined, and a rear platen moving unit that moves the rear platen to the compensated rear platen position thus determined.

The mold temperature obtaining unit may obtain, as a mold temperature, any one of a temperature of a mold measured by a mold temperature measuring instrument, a mold temperature at a time of mold thickness adjustment, the mold temperature input from inputting means, an ambient temperature stored in a storage device in advance, and an ambient temperature measured by an ambient temperature measuring instrument.

According to the present invention, it is possible to calculate the amount of thermal expansion of the mold that is expected to occur at the completion of a rise in temperature from input molding conditions and compensate the position of the rear platen that is adjusted at the time of installation of the mold. As a result, the position of the rear platen is adjusted so that an intended clamping force can be generated at the completion of a rise in temperature of the mold, which eliminates the inconvenience of adjusting the position of the rear platen that has been required after the completion of a rise in temperature of the mold in a conventional technique, reduces the time required to perform an adjustment, and increases productivity. Moreover, since there is no need to adjust the position of the rear platen after clamping is performed, an excessive clamping force is not generated at the time of clamping, making it possible to avoid an excessive load from being put on the mold and the injection molding machine and prevent a decrease in the longevity of the mold and the injection molding machine.

BRIEF DESCRIPTION OF THE DRAWINGS

These and other objects and features of the present invention will become apparent from the following description of embodiments with reference to the accompanying drawings in which:

FIG. 2 is a flowchart describing the flow of a mold thickness adjustment performed by the mold thickness adjusting apparatus of FIG. 1;

FIGS. 3A and 3B are diagrams, each schematically depicting a state at the time of installation of a mold in adjustment of the position of a rear platen when a mold thickness adjustment is performed in the injection molding machine of FIG. 1.

DETAILED DESCRIPTION OF THE PREFERRED EMBODIMENTS

Figure 1:
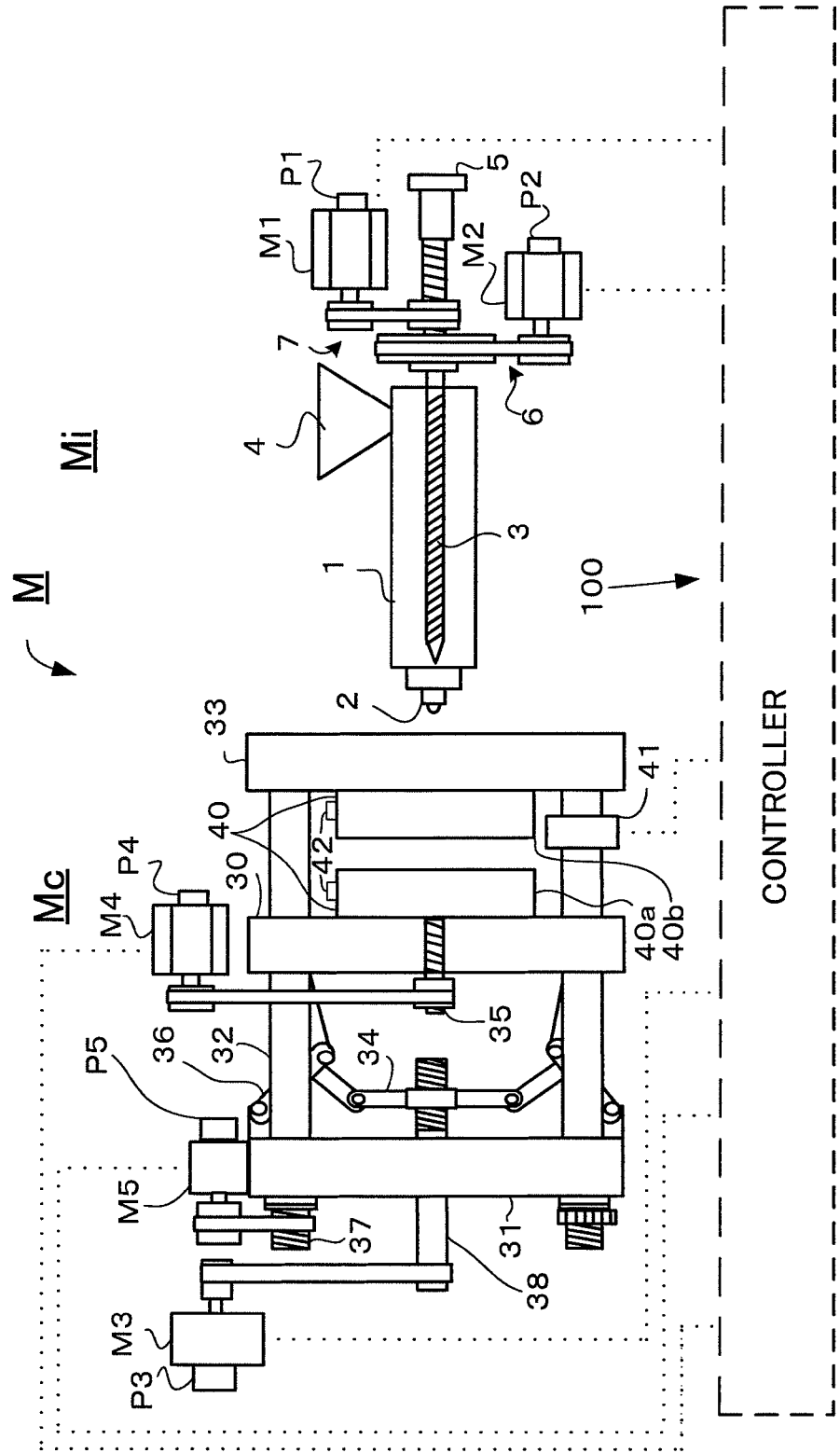
FIG. 1 is a diagram depicting a general structure of an injection molding machine M provided with a mold thickness adjusting apparatus according to the present invention.

A general structure of an injection molding machine M provided with a mold thickness adjusting apparatus according to the present invention will be described by using FIG. 1.

The injection molding machine M has a clamping unit Mc and an injection unit Mi on a machine stage (not shown). The injection unit Mi heats and melts resin material (pellets) and injects the molten resin into a cavity of a mold 40. The clamping unit Mc mainly opens and closes (performs mold closing, clamping, and mold opening of) the mold 40 (a movable-side mold 40a and a fixed-side mold 40b).

First, the injection unit Mi will be described. A nozzle 2 is attached to the tip of an injection cylinder 1, and a screw 3 is placed through the injection cylinder 1. In the screw 3, a resin pressure sensor 5 using a load cell or the like that detects resin pressure based on the pressure exerted on the screw 3 is provided.

The screw 3 is rotated by a screw rotation servomotor M2 via a transmission mechanism 6 formed of a pulley, a belt, and so forth. Moreover, the screw 3 is driven by a screw forward and backward movement servomotor M1 via a transmission mechanism 7 including a mechanism that converts rotational motion into linear motion, such as a pulley, a belt, a ball screw/nut mechanism, and so forth, and is moved in an axial direction of the screw 3. Incidentally, character P1 denotes a position/speed detector that detects the position and the speed of the screw 3 in an axial direction by detecting the position and the speed of the screw forward and backward movement servomotor M1, and character P2 denotes a position/speed detector that detects the rotational position and speed of the screw 3 about the axis by detecting the position and the speed of the servomotor M2. The positions and the speeds detected by these position/speed detectors P1 and P2 are sent to a controller 100. Reference numeral 4 denotes a hopper that supplies resin to the injection cylinder 1.

Next, the clamping unit Mc will be described. The clamping unit Mc is provided with a movable platen forward and backward movement motor M3 that moves a movable platen 30 forward and backward, a rear platen 31, an ejector forward and backward movement motor M4 for making an ejector pin for knocking a molded object out of the mold stick out, the movable platen 30, four tie bars 32, a fixed platen 33, a crosshead 34, an ejector mechanism 35, and a toggle mechanism 36.

The rear platen 31 and the fixed platen 33 are coupled to each other by the tie bars 32, and the movable platen 30 is disposed in such a way as to be guided by the tie bars 32. The movable-side mold 40a is attached to the movable platen 30, and the fixed-side mold 40b is attached to the fixed platen 33. Moreover, to any one of the movable-side mold 40a and the fixed-side mold 40b or both, a temperature sensor 42 formed as a thermocouple that detects the temperature of a mold is attached.

By moving the crosshead 34 forward or backward, the crosshead 34 attached to a ball screw shaft 38 that is driven by the movable platen forward and backward movement motor M3, it is possible to activate the toggle mechanism 36. In this case, when the crosshead 34 is moved forward (moved to the right in FIG. 1), the movable platen 30 is moved forward and mold clamping is performed. Then, a clamping force obtained by multiplying thrust generated by the movable platen forward and backward movement motor M3 by toggle magnification is generated, and clamping is performed by the clamping force.

To one of the four tie bars 32, a clamping force sensor 41 is attached. The clamping force sensor 41 is a sensor that detects strains (mainly elongation) of the tie bar 32. Tension corresponding to the clamping force is applied to the tie bar 32 at the time of clamping, and the tie bar 32 slightly elongates in proportion to the clamping force. Therefore, by detecting the amount of elongation of the tie bar 32 by the clamping force sensor 41, it is possible to know the clamping force that is actually applied to the mold 40 (the movable-side mold 40a and the fixed-side mold 40b). As the clamping force sensor 41, a strain sensor, for example, can be used.

To the rear platen 31, a clamping position adjustment motor M5 is attached. To a rotating shaft of the clamping position adjustment motor M5, a driving gear (not shown) is attached. A power transmission member such as a synchronous belt is stretched over gears of tie bar nuts (not shown) and the above-described driving gear. Therefore, when the driving gear is rotated by driving the clamping position adjustment motor M5, the tie bar nuts that are screw-threadably engaged with the screw sections 37 of the tie bars 32 rotate in synchronization. This makes it possible to move the rear platen 31 forward or backward by a predetermined distance by rotating the clamping position adjustment motor M5 by a predetermined rotation number in a predetermined direction.

It is preferable that the clamping position adjustment motor M5 is a servomotor, and the clamping position adjustment motor M5 is provided with a position detector P5 for use in detecting a rotational position. The detection signal of the rotational position of the clamping position adjustment motor M5 detected by the position detector P5 is input to the controller 100.

The controller 100 of the injection molding machine M is configured such that a microprocessor for numerical control, a microprocessor for a program controller, ad CPU for servo control, and so forth, which are not shown, are provided in the controller 100.

Molding operation using the above-described injection molding machine M will be described. When the movable platen forward and backward movement motor M3 is rotated in the normal direction, the ball screw shaft 38 rotates in the normal direction, the crosshead 34 screw-threadably engaged with the ball screw shaft 38 moves forward (to the right in FIG. 1), the toggle mechanism 36 is activated, and the movable platen 30 moves forward.

When the movable-side mold 40a attached to the movable platen 30 makes contact with the fixed-side mold 40b (a mold closing state), the process proceeds to a clamping process after rear platen position compensation, which will be described later, is performed. In the clamping process, by further driving the movable platen forward and backward movement motor M3 in the normal direction, a clamping force is generated in the mold 40 by the toggle mechanism 36.

Then, by driving the screw forward and backward movement servomotor M1 provided in the injection unit Mi, the screw 3 moves forward in an axial direction thereof, and the cavity space formed in the mold 40 is filled with the molten resin.

To perform mold opening, the movable platen forward and backward movement motor M3 is driven in an opposite direction. As a result, the ball screw shaft 38 rotates in an opposite direction, the crosshead 34 accordingly moves backward, the toggle mechanism 36 is activated in a direction in which the toggle mechanism 36 is bent, and the movable platen 30 moves (moves backward) toward the rear platen 31.

After the mold opening process is completed, the ejector forward and backward movement motor M4 for making an ejector pin for knocking a molded object out of the movable-side mold 40a stick out is activated. As a result, the ejector pin (not shown) sticks out from the inner surface of the movable-side mold 40a, and the molded object in the movable-side mold 40a is knocked out of the movable-side mold 40a.

Figure 3A:
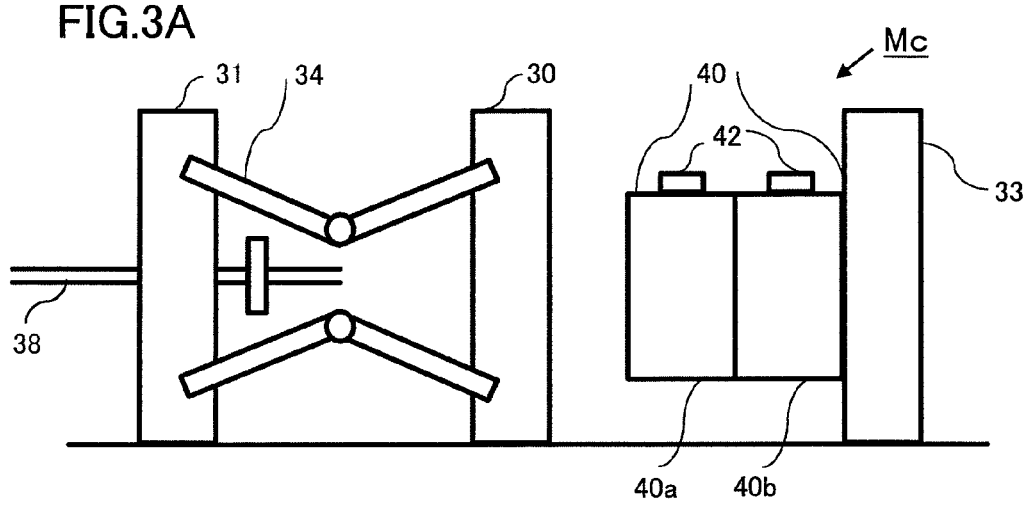
FIGS. 3A to 3C are diagrams, each schematically depicting part of a clamping unit Mc in the injection molding machine M depicted in FIG. 1.
Figure 3B:
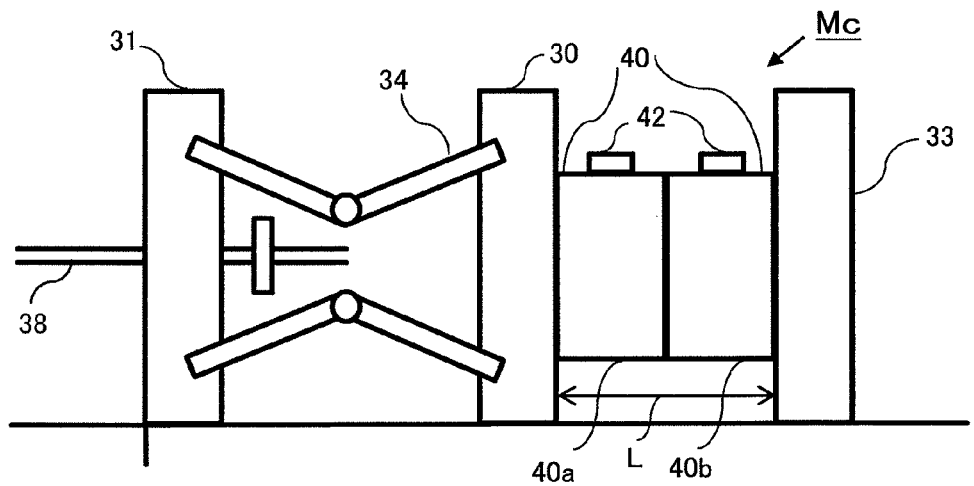
Figure 3C:
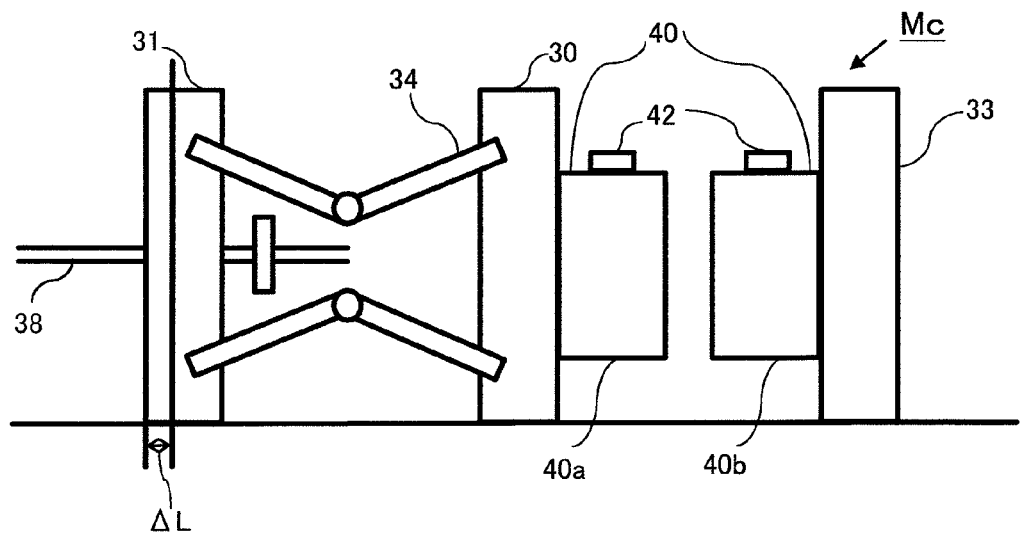

FIGS. 3A to 3C are diagrams, each schematically depicting part of the clamping unit Mc in the injection molding machine M depicted in FIG. 1, and depict various operation states of the clamping unit Mc. The position of the mold 40 (the movable-side mold 40a and the fixed-side mold 40b) of FIG. 3C corresponds to the position of the mold 40 depicted in FIG. 1. FIG. 3A depicts the position of the movable platen 30 with respect to the fixed platen 33 when the mold 40 is installed. Incidentally, in FIGS. 3A to 3C, the tie bars 32 are not depicted to make the structure more visible.

When the mold 40 is installed, the space between the movable platen 30 and the fixed platen 33 is made larger than the thickness of the mold 40 so that the mold 40 (the movable-side mold 40a and the fixed-side mold 40b) can be placed between the movable platen 30 and the fixed platen 33. The set clamping force is provided by the position of the rear platen 31 (the space between the rear platen 31 and the fixed platen 33). Thus, to determine the position of the rear platen 31 for providing the set clamping force, first, the movable platen 30 is moved backward from the fixed platen 33 by an advancement amount corresponding to the set clamping force. Next, the rear platen 31 is moved forward by driving the clamping position adjustment motor M5 in a state in which the output thereof is limited. Then, when the movable-side mold 40a attached to the movable platen 30 and the fixed-side mold 40b attached to the fixed platen 33 come into contact with each other, the driving of the rear platen 31 to move the rear platen 31 forward is stopped.

FIG. 2 is a flowchart describing the flow of a mold thickness adjustment performed by the mold thickness adjusting apparatus of FIG. 1. Hereinafter, processing in each step will be described.

(Step SA1) The fixed-side mold 40b and the movable-side mold 40a are attached to the fixed platen 33 (see FIG. 3A).

(Step SA2) By moving the rear platen 31 forward to bring the movable platen 30 and the movable-side mold 40a into contact with each other, the movable-side mold 40a is attached to the movable platen 30 (see FIG. 3B; here, L represents a mold thickness).

(Step SA3) The mold temperature at the time of mold thickness adjustment is obtained. Specifically, the temperature of the mold 40 is measured by the temperature sensor 42 attached to any one of the movable-side mold 40a and the fixed-side mold 40b or both.

(Step SA4) The mold temperature at the time of molding is obtained. Specifically, the mold temperature at the time of molding which is stored in the controller 100 is read.

(Step SA5) The amount of compensation ΔL is determined based on the mold temperature at the time of mold thickness adjustment obtained in Step SA3 and the mold temperature at the time of molding obtained in Step SA4. Specifically, the amount of compensation ΔL is determined by the following expression:

$$\Delta L = L \times \alpha \times (T - T1).$$

Here, L is the mold thickness, α is the coefficient of linear expansion, T is the mold temperature at the time of molding, that is, the mold temperature after the rise of temperature, T1 is the mold temperature at the time of mold thickness adjustment, and ΔL determined by L, α, T, and T1 is an increase in a mold thickness which is expected to be produced by the thermal expansion of the mold.

(Step SA6) The position of the rear platen 31 is adjusted. Specifically, the rear platen 31 is moved backward by the amount of compensation ΔL from the state in which the movable platen 30 and the movable-side mold 40a are in contact with each other (FIG. 3C).

Incidentally, in the embodiment, to obtain the mold temperature at the time of mold thickness adjustment, the temperature of the mold is measured by the temperature sensor 42 attached to each of the movable-side mold 40a and the fixed-side mold 40b. Instead, the mold temperature obtained by other means, such as the mold temperature at the time of mold thickness adjustment which has been input to the controller 100 of the injection molding machine, the value stored in advance in a built-in storage device (not shown) of the controller 100 of the injection molding machine, and the value of the ambient temperature measured by an ambient temperature measuring instrument, can also be used.

Moreover, in the above-mentioned mold thickness adjustment described in FIG. 2 (and FIGS. 3A and 3B), both the fixed-side mold 40b and the movable-side mold 40a are attached to the fixed platen 33 (Step SA1, FIG. 3A), and the rear platen is moved forward to bring the movable platen 30 and the movable-side mold 40a into contact with each other, whereby the movable-side mold 40a is attached to the movable platen 30 (Step SA2, FIG. 3B). However, alternatively, in a mold thickness adjustment, the movable-side mold 40a may be attached to the movable platen 30 in advance (and the fixed-side mold 40b may be attached to the fixed platen 33 in advance), and, in Step SA2, the rear platen may be moved forward until the movable-side mold 40a attached to the movable platen 30 and the fixed-side mold 40b attached to the fixed platen 33 come into contact with each other.

Furthermore, in the above-mentioned mold thickness adjustment described in FIG. 2, the mold temperature at the time of mold thickness adjustment is obtained in a state in which the rear platen has been moved forward and the movable platen 30 and the movable-side mold 40a are in contact with each other, but the mold temperature at the time of mold thickness adjustment may be obtained in other ways. For example, the mold temperature at the time of mold thickness adjustment may be obtained when the movable-side mold 40a and the fixed-side mold 40b are installed.

Moreover, an amount of compensation may be calculated by any calculation method other than the method in which the above-described expansion is used, as long as the calculation method calculates the amount of compensation by using the mold temperature at the time of mold thickness adjustment and the mold temperature at the time of molding.

What is claimed is:
1. A mold thickness adjusting apparatus of an injection molding machine, wherein
the injection molding machine includes
a fixed platen to which a fixed-side mold is attached, a rear platen coupled to the fixed platen via a plurality of tie bars, a clamping mechanism provided in the rear platen, and a movable platen which is arranged so as to move forward and backward along the tie bars by means of the clamping mechanism and to which a movable-side mold is attached, and the mold thickness adjusting apparatus is configured to perform a mold thickness adjustment by adjusting a space between the fixed platen and the rear platen, and includes a mold temperature setting unit configured to set a temperature of any one of the fixed-side mold and the movable-side mold or both at a time of molding, a mold temperature obtaining unit configured to obtain a temperature of any one of the fixed-side mold and the movable-side mold or both at a time of mold thickness adjustment, a temperature difference calculating unit configured to calculate a difference in temperature between the temperature set by the mold temperature setting unit and the temperature obtained by the mold temperature obtaining unit, a mold thermal expansion amount calculating unit configured to calculate amounts of thermal expansion of the fixed-side mold and the movable-side mold from the difference in temperature, a rear platen position determination unit configured to determine a position of the rear platen to generate a set clamping force at an ambient temperature at the time of mold thickness adjustment, a rear platen position compensation unit configured to determine a compensated rear platen position by adding the amounts of thermal expansion of the fixed-side mold and the movable-side mold to the position of the rear platen thus determined, and a rear platen moving unit configured to move the rear platen to the compensated rear platen position thus determined.

2. The mold thickness adjusting apparatus of an injection molding machine according to claim 1, wherein the mold temperature obtaining unit is configured to obtain, as a mold temperature, any one of a temperature of a mold measured by a mold temperature measuring instrument, a mold temperature at the time of mold thickness adjustment, a mold temperature input from an inputting unit, an ambient temperature stored in a storage device in advance, and an ambient temperature measured by an ambient temperature measuring instrument.

\* \* \* \* \*